United States Patent [19]
Anthony et al.

[11] Patent Number: 6,017,173
[45] Date of Patent: Jan. 25, 2000

[54] WEB RETRACTOR WITH RELEASE LEVER AND TIGHTENING HANDLE

[75] Inventors: James T. Anthony, Noblesville; David D. Merrick, Cicero, both of Ind.

[73] Assignee: Indiana Mills & Manufacturing, Inc., Westfield, Ind.

[21] Appl. No.: 08/969,276

[22] Filed: Nov. 13, 1997

[51] Int. Cl.⁷ ....................................................... B60P 7/08
[52] U.S. Cl. ............................ 410/2; 410/103; 410/100; 280/414.1
[58] Field of Search ............................... 410/103, 12, 100, 410/2; 114/344; 280/414.1; 414/559; 242/394, 611.1; 254/365, 376

[56] References Cited

U.S. PATENT DOCUMENTS

| | | | |
|---|---|---|---|
| 4,227,286 | 10/1980 | Holmberg | 410/103 X |
| 4,842,458 | 6/1989 | Carpenter | 410/3 |
| 5,172,928 | 12/1992 | Capps | 280/414.1 |
| 5,282,706 | 2/1994 | Anthony et al. | 410/100 |
| 5,417,447 | 5/1995 | Godbersen | 280/414.1 |
| 5,800,105 | 9/1998 | Stump | 410/103 |
| 5,879,114 | 3/1999 | Spence | 410/77 |

*Primary Examiner*—Stephen T. Gordon
*Attorney, Agent, or Firm*—Woodard, Emhardt, Naughton, Moriarty & McNett

[57] ABSTRACT

A web retractor including a spring biased spool upon which is mounted a web. The distal end of the web includes a connector to releasably engage a watercraft to hold the watercraft atop a boat trailer. A release lever is connected to the retractor pawl allowing the spool to rotate and web to be extended. A crank is attached to the spool axle and when engaged rotates the axle to tighten the web. The crank is normally positioned in an unengaged position allowing the spool to rotate without crank movement.

5 Claims, 4 Drawing Sheets

WEB RETRACTOR WITH RELEASE LEVER AND TIGHTENING HANDLE

BACKGROUND OF THE INVENTION

1. Field of the Invention

This invention is in the field of web retractors.

2. Description of the Prior Art

Web retractors have a variety of uses including vehicle seat belt applications. The known retractors include a spring biased spool having the web wound thereon with the spool normally retracting the web. A pair of ratchet shaped end flanges are provided on the opposite ends of the spool and engage a spring biased pawl for releasably locking the spool in place. The pawl may automatically be moved apart from the ratchet shaped wheels by means of a clutch plate or manually moved and disengaged from the spool by means of a cable or lever mechanism such as shown in the commonly owned U.S Pat. No. 5,380,066.

Hand crank operated retractors are also known which utilize cable or webs to winch or secure objects together. For example, boat trailors include rotatably mounted spools having cable wound thereon with the spoon being rotatably by means of a hand crank. The end of the cable may be attached to the bow of the boat and may be pulled onto the trailer and secured thereon by cranking the spool thereby retracting the cable. Such boat trailer winches typically include a pawl which may be manually moved into and out of engagement with a sprocket attached to the spool for either locking or releasing the spool.

Disclosed herein is a web retractor having many of the features of the retractors in the seat belt industry but which has been adapted to the boat trailer environment. More particularly, the retractor disclosed herein is particularly useful in securing personal watercraft, such as a jet ski or small speed boat. Due to the light weight of the personal watercraft as compared to a regular watercraft, it is possible to pull the watercraft onto the trailer by means of our retractor and to then lock the retractor in place thereby securing the watercraft to the trailer. In the event the retractor web is placed in high tension then upon release the handle or crank may spin. We have therefore devised a handle or crank engageable with the retractor spool only during the retraction of the web. Further, we have incorporated a release lever attached directly to the pawl allowing the user to engage the release lever with one hand and the crank with the other hand.

SUMMARY OF THE INVENTION

The combination of a boat trailer, a watercraft including a bow connector, and a web retractor including a main frame and a spring biased spool with a ratchet shaped wall rotatably mounted to the main frame. The retractor includes a web having a proximal end fastened to the spool and a distal end extendable from the retractor. The retractor includes a first spring connected to the spool and the main frame and is operable to cause the spool to rotate to retract the web but is yieldable to allow the web to be pulled outwardly from the retractor. The retractor includes a web connector mounted to the distal end and is releasably lockable with the bow connector. The retractor includes a pawl normally locked to the ratchet wall limiting rotation of the spool and extension of the web. A lever is associated with the pawl and is movable to move the pawl away from the ratchet wall to allow extension of the web when the web is pulled outwardly but also to allow the spring biased spool to rotate to retract the web. The web retractor includes a hand operated crank connected to the spool to rotate same in a direction retracting and tightening the web when the web connector is locked to the bow connector securing the watercraft on the boat trailer.

DESCRIPTION OF THE PREFERRED EMBODIMENT

Figure 1:
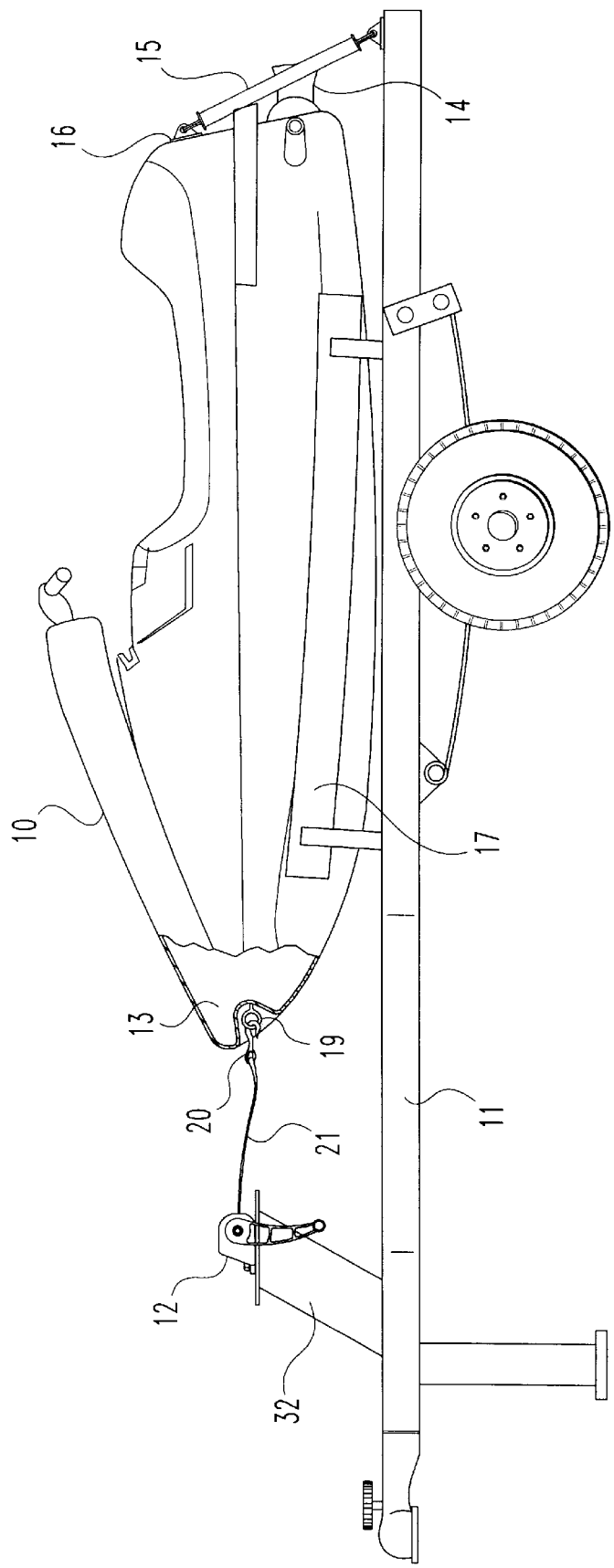
FIG. 1 is a fragmentary side view of a personal watercraft secured to a boat trailer by a web retractor.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a personal watercraft 10, such as a jet ski with propulsion unit 14 or small speed boat mounted atop a trailer 11 and secured thereto by means of a web 21 extending from retractor 12 and attached to the bow 13 of the watercraft. A pair of webs secure the transom 16 of the watercraft trailer. Transom 16 includes a pair of eye bolts or recessed handles or handles to which webs 15 are attached. Bow 13 is shown as fragmented illustrating a recessed pin or rod 19 around which hook 20 attached to the distal end of web 21 is releasably engageable. Trailer 11 includes a pair of skids 17 upon which the watercraft is pulled onto and then supported on the trailer. Our improvement includes the retractor 12 and associated web to releasably lock to the bow of the watercraft.

Retractor 12 includes a housing 22 (FIG. 2) produced from a water resistant material, such as plastic. The housing consists of an upper portion 23 joined to a bottom portion 24 by means of a living hinge 25 with the upper and lower housing portions secured together once the retractor main frame 26 (FIG. 3) is located therein. The main frame consists of two parallel and upstanding walls 27 and 28 integrally joined to a base wall 29. The base wall is provided with a hole 30 through which a conventional fastener 31 (FIG. 2) extends to secure the retractor main frame atop a pedestal 32 (FIG. 1) of the boat trailer. A spool 33 (FIG. 3) is rotatably mounted to axle 34 to the upstanding walls 27 and 28 with the proximal end of web 21 being fixedly attached to the spool whereas the distal end 36 (FIG. 2) is attached to connector 20. Connector 20 may take the form of a standard hook shaped main body having a spring biased arm 35 for closing the hook shaped end of the connector thereby enabling the connector to be slipped onto or removed from bow pin 19 (FIG. 1).

End wall 28 is fragmented to illustrate the conventional configuration of the ratchet shaped end walls 37 and 38 of spool 33. Ratchet shaped end walls 37 and 38 are fixedly attached to axle 34 and rotate therewith. Likewise, the proximal end of web 21 is fixedly attached to the spool axle. Thus, rotation of axle 34 in the direction of arrow 40 causes the spool to rotate in the same direction allowing web 21 to be pulled outwardly whereas rotation of the axle in the direction opposite of arrow 40 results in retraction of the web. The prior art retractors include a pawl 41 having opposite ends received in pivot holes 42 provided in walls 27 and 28. The edge 43 of pawl 41 may be positioned to engage the teeth of ratchet shaped walls 37 and 38 when the pawl is pivoted in the direction of arrow 44. The prior art retractors also include a spring 39 having one end connected to wall 26 and the opposite end connected to axle 34 with the spring operable to normally cause axle 34 to rotate in the direction opposite of arrow 40 thereby retracting the web but yieldable to allow the web to be pulled outwardly with the axle rotating in the direction of arrow 40. The prior art retractors also include a strengthening member 46 having its opposite ends attached to and spacing apart walls 27 and 28.

Figure 2:
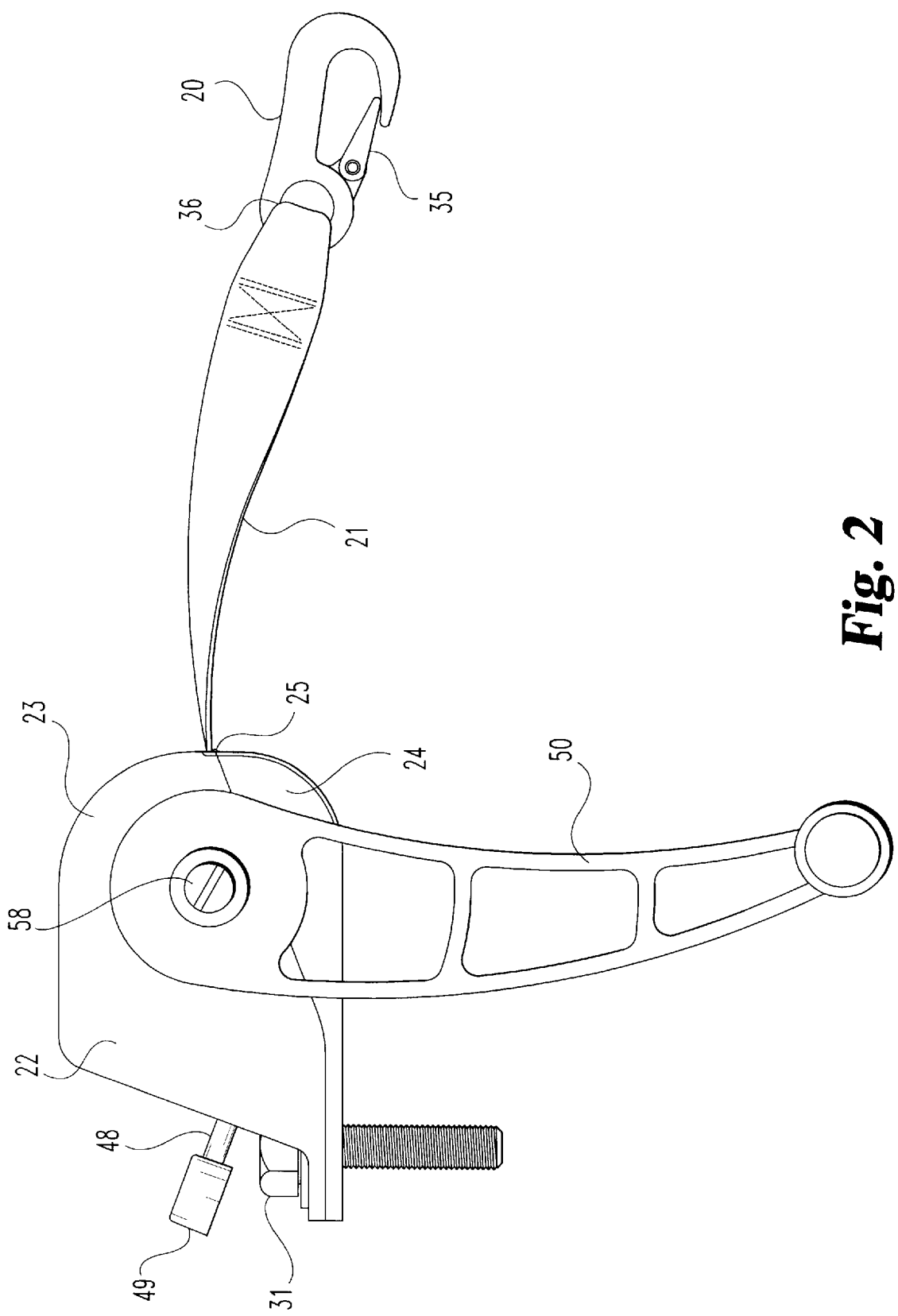
FIG. 2 is an enlarged side view of the web retractor of FIG. 1.

We have improved the prior art retractors by adding a helical spring 47 having a top end fixedly attached to member 46 and a bottom end fixedly attached to pawl 41 with spring 47 being operable to normally urge pawl 41 to pivot in the direction of arrow 44 so that edge 43 engages the teeth of ratchet shaped walls 37 and 38. We have further added a lever 48 cantileverly mounted to pawl 41 and having a push button shaped proximal end 49 located outwardly of housing 22 (FIG. 2). Thus, the user may force button 49 downwardly thereby disengaging pawl end 43 from the ratchet shaped walls 37 and 38 allowing spring 39 to rotate axle 34 in a direction opposite of arrow 40 retracting the web into the retractor. Likewise, with the button depressed, the user may pull the web outwardly to engage hook 20 with the bow pin of the watercraft.

Figure 3:
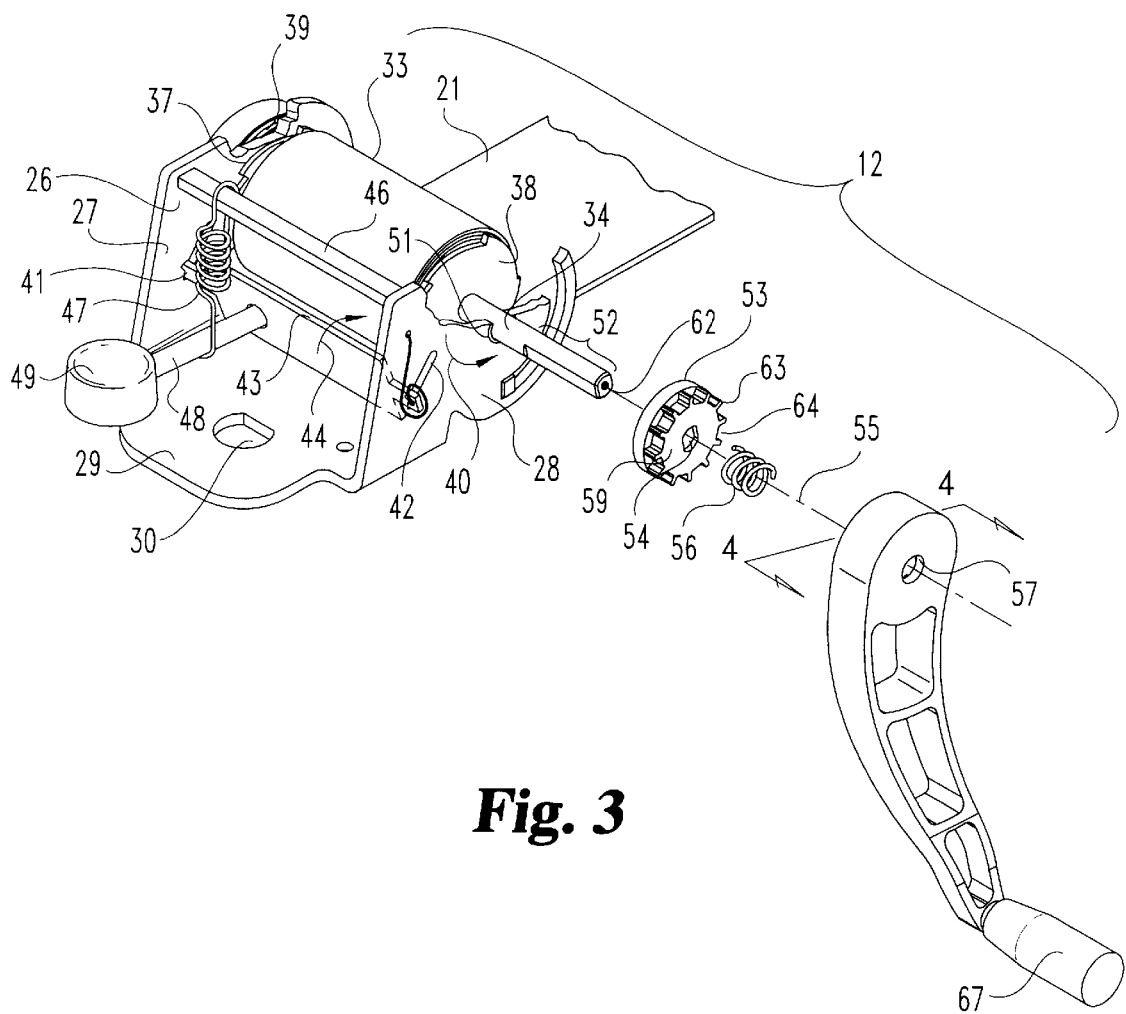
FIG. 3 is an exploded perspective and fragmentary view of the retractor of FIG. 2 with the housing removed therefrom.
Figure 4:
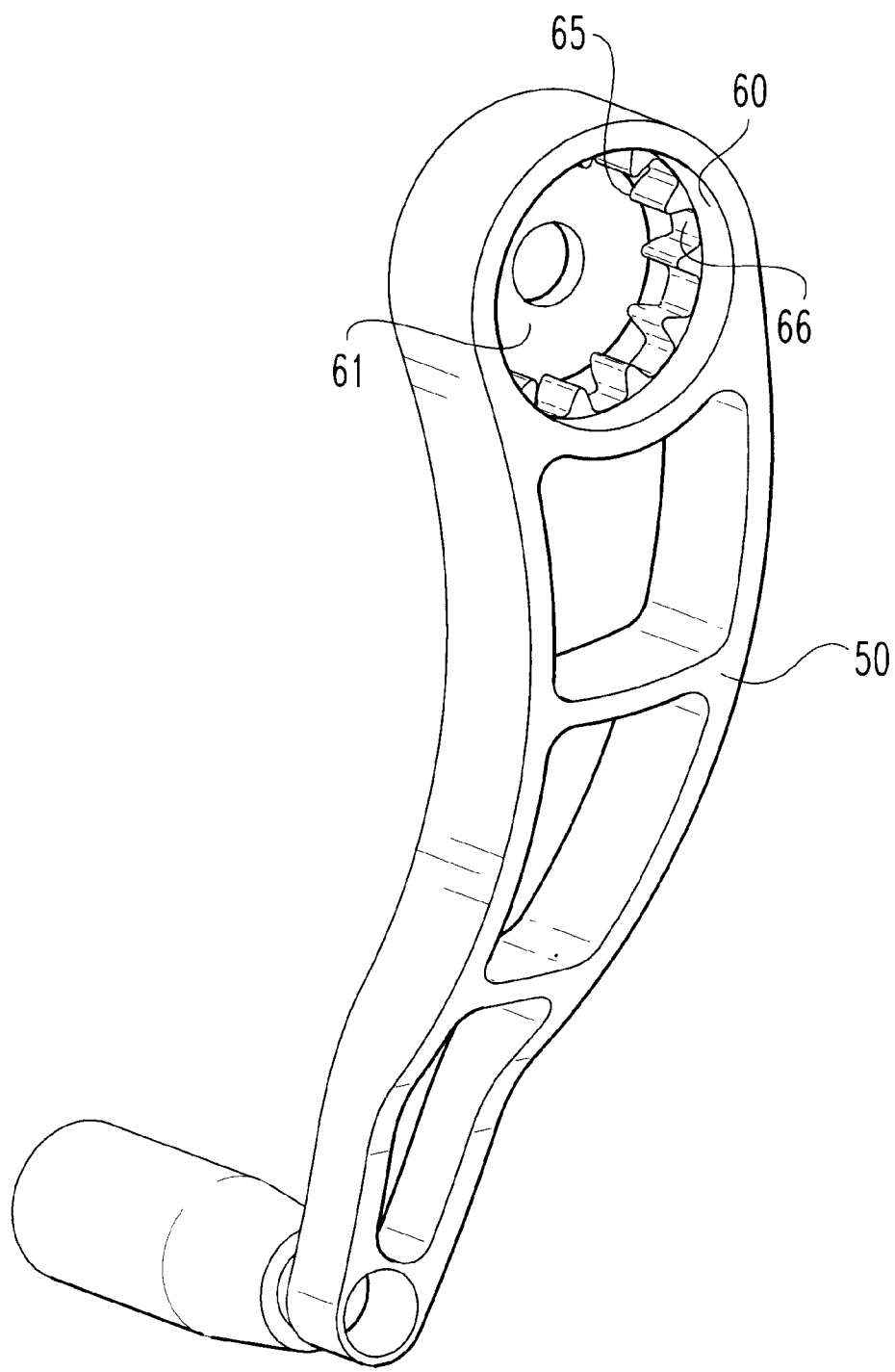
FIG. 4 is a view of the crank taken along the line of 4—4 of FIG. 3 and viewed in the direction of the arrows.

We have further added a handle or crank 50 (FIG. 2) to the retractor to enable the user to tighten or retract the web thereby pulling the watercraft onto the trailer and tightly securing the watercraft thereon. Axle 34 is rotatably received by conventional bearings 51 and has a cylindrical configuration for a sufficient length to extend through the sidewall of housing 22. The outer portion 52 of the axle has a pair of parallel flat sides to receive disc 53. Disc 53 includes an axle hole 54 with a pair of parallel flat sides with the hole sized so that the flat sides of the hole contact the flat sides of axle portion 52 ensuring rotation of the axle and disc as a unit. A helical spring 56 has one end resting atop the outwardly facing flat surface 59 of the disc with the opposite end of the spring extending into cavity 60 (FIG. 4) and contacting flat surface 61 of handle 50. The axis of rotation 55 of axle 34 extends centrally through disc 53, spring 56 and hole 57 of handle 50. A conventional fastening device 58 is threadedly received by a threaded hole 62 of axle 34 securing the handle to the axle. Disc 53 includes a plurality of radially extending teeth 63 spaced apart by recesses 64. Likewise, cavity 60 of handle 50 includes a plurality of radially extending teeth 65 spaced apart by recesses 66. Both teeth 63, 65, and recesses 64. 66 extend not only radially outward from the axis of rotation but also extend in the direction of the axis of rotation. Spring 56 is operable to normally force handle 50 apart from disc 53 so that teeth 63 do not engage teeth 65. Thus, spool 33 may rotate in either direction without movement of the handle. In such condition, the knob end 67 of the handle is normally positioned by the force of gravity in the downward position as illustrated in FIG. 3. In the event the user desires to retract or tighten the web, then handle 50 is moved in the direction of axis 55 toward wall 28 until teeth 63 are positioned in recesses 66 and teeth 65 are positioned in recesses 64. The user may then rotate the crank in a direction opposite of arrow 40 thereby retracting and tightening the web.

An advantage of the crank and retractor shown in FIG. 3 results when web 21 is in a tightened condition and lever 48 is pushed downwardly thereby moving the pawl from the ratchet shaped teeth and allowing the spool to rotate in the direction of arrow 40 reducing web tension while also allowing the weight of the watercraft to move away from the retractor and off the trailer. As the spool rotates in the direction of arrow 40, handle 50 will remain stationary.

In many cases, the watercraft will be located fairly close to the retractor handle preventing the handle from being rotated through 360° in order to tighten the web. In such a case, the handle may be moved inwardly so that teeth are interengaged and the handle then pivoted through a limited arc, with the handle then being moved outwardly to disengage the teeth and the crank pivoted back to its original position with the process then being repeated until the web is tightened to the desired amount.

Pawl 41 and spring 47 are operable to normally lock the pawl to the ratchet shaped walls 37 and 38 limiting rotation of the spool and extension of the web. Lever 48 is movable to move the pawl away from the ratchet shaped walls to allow extension of the web when the web is pulled outwardly but also to allow the spring biased spool to rotate to retract the web. The crank 50 is movably mounted to axle 34 and is designed to move along axis 55 toward and away from the spool between an engaged position wherein the teeth 63 and 65 are interlocked to a non-engaged position wherein the spool may rotate without movement of the crank. Spring 47 is yieldable to allow rotation of the spool as the handle or crank 50 is rotated to allow retraction of the web.

Many variations are contemplated and included in the present invention. For example, the retractor has been shown in combination with a watercraft although many additional uses of the retractor are possible.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. The combination of:
    a boat trailer;
    a watercraft including a bow connector;
    a web retractor including a main frame and a spring biased spool with a ratchet shaped wall rotatably mounted to said main frame, said retractor including a web having a proximal end fastened to said spool and a distal end extendable from said retractor, said retractor including a first spring connected to said spool and said main frame and operable to cause said spool to rotate to retract said web but yieldable to allow said web to be pulled outwardly from the retractor, said retractor including a web connector mounted to said distal end and releasably lockable with said bow connector, said retractor including a pawl normally locked to said ratchet wall limiting rotation of said spool and extension of said web, said web retractor including a lever associated with said pawl and movable to move said pawl away from said ratchet wall to allow extension of said web when said web is pulled outwardly but also to allow said spring biased spool to rotate to retract said web, said web retractor including a hand operated crank connected to said spool to rotate same in a direction retracting and tightening said web when said web connector is locked to said bow connector securing said watercraft on said boat trailer.

2. The combination of claim 1 and further comprising:

a housing enclosing said retractor with said lever having a proximal end connected to said pawl and a distal end located outwardly of said housing, said crank located outwardly of said housing, said retractor including a pawl spring mounted to said main frame and normally operable to move said pawl against said ratchet wall locking same in position but yieldable to allow said pawl to move apart from said ratchet wall when said lever is moved allowing said spool to rotate.

3. The combination of claim 1 wherein:

said spool has an axle and an axis of rotation extending along said axle, said crank is movably mounted to said axle to move along said axis toward and away from said spool between an engaged position and an unengaged position wherein said spool may rotate without movement of said crank when said crank is in said unengaged position.

4. The combination of claim 3 wherein:

said retractor includes a first ratchet member mounted to said axle and rotatable therewith, said crank includes a ratchet surface facing inwardly toward said first ratchet member, said retractor includes a second spring engaged with said crank operable to normally force said crank to said unengaged position and said ratchet surface apart from said first ratchet member allowing said axle to move without corresponding movement of said crank but yieldable to allow said crank to be manually moved along said axis to said engaged position with said ratchet surface engaging said first ratchet member and causing said axle to rotate when said crank is moved.

5. The combination of claim 4 wherein:

a housing enclosing said retractor with said lever having a proximal end connected to said pawl and a distal end located outwardly of said housing, said crank located outwardly of said housing, said retractor including a pawl spring mounted to said main frame and normally operable to move said pawl against said ratchet wall locking same in position but yieldable to allow said pawl to move apart from said ratchet wall when said lever is moved allowing said spool to rotate.

\* \* \* \* \*